July 25, 1961  E. FOUQUET  2,993,390
APPARATUS AND METHOD FOR MANUFACTURING FLAT AND CURVED FILES
Filed Nov. 24, 1954  2 Sheets-Sheet 1
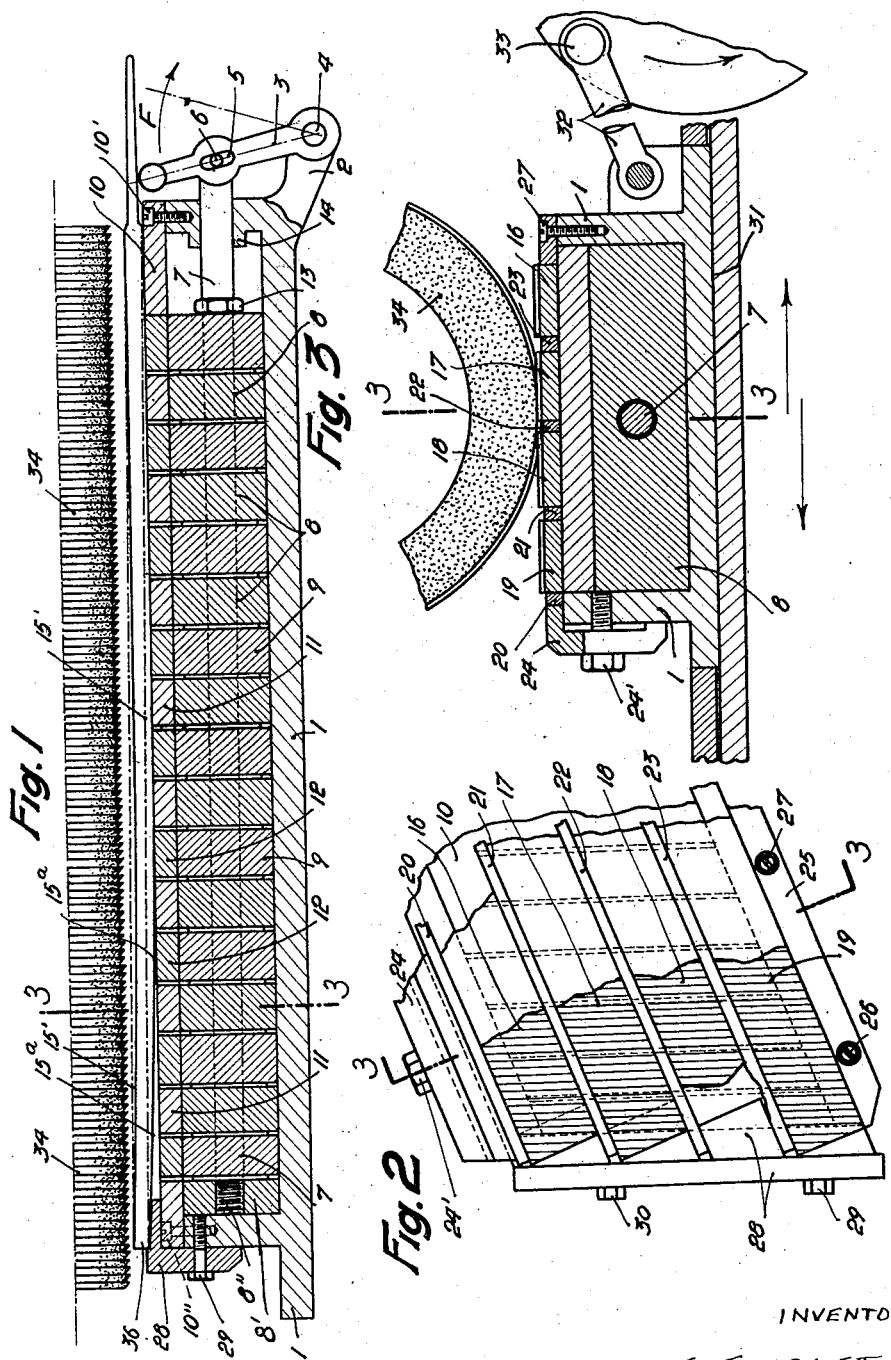
INVENTOR:
EUGENE FOUQUET
BY
ATTORNEY

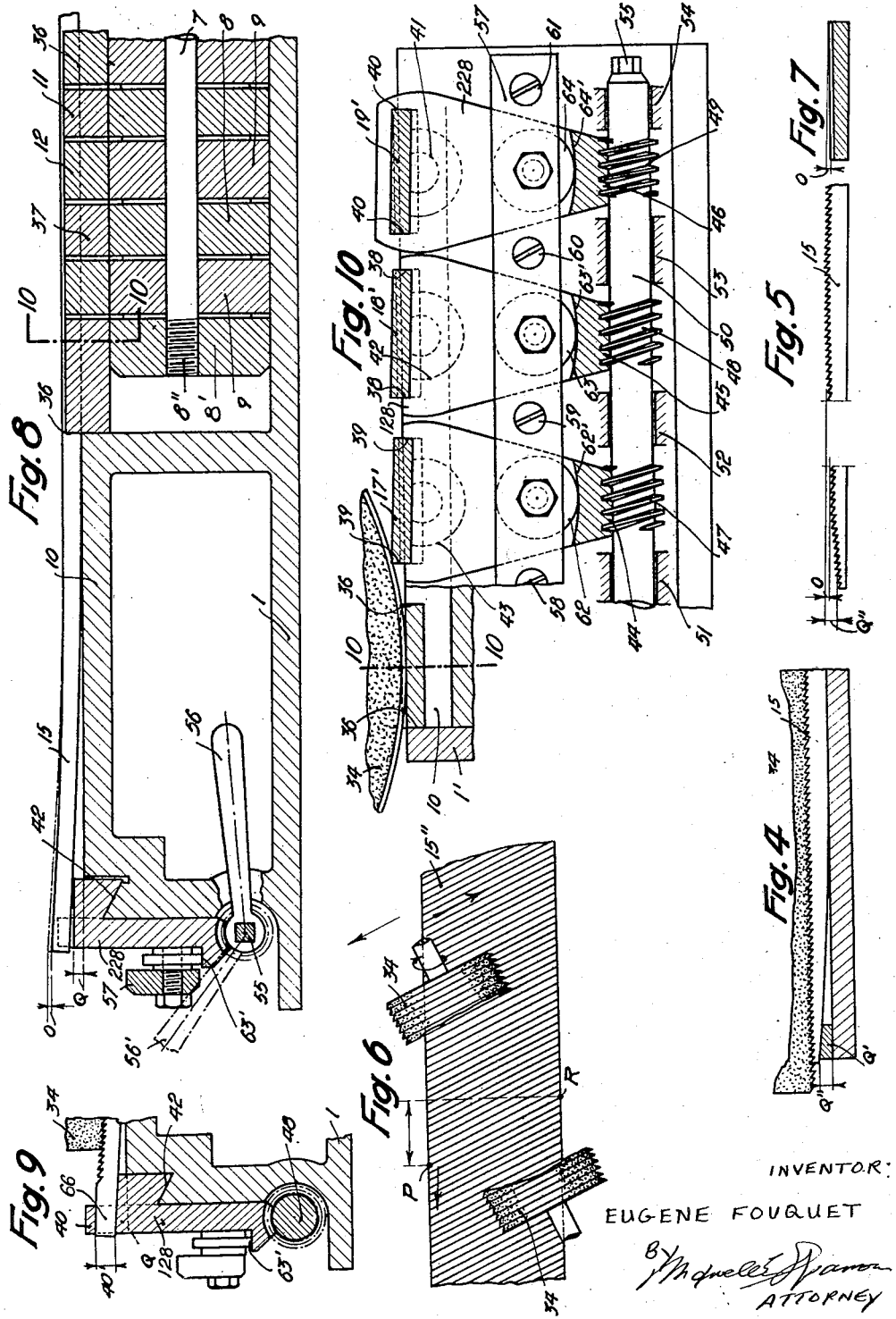

United States Patent Office 2,993,390
Patented July 25, 1961

2,993,390
APPARATUS AND METHOD FOR MANUFAC-
TURING FLAT AND CURVED FILES
Eugene Fouquet, 63 Rue Jean Jaures,
Bois-Colombes, France
Filed Nov. 24, 1954, Ser. No. 471,064
Claims priority, application France Nov. 28, 1953
6 Claims. (Cl. 76—24)

This invention relates to a new process of manufacturing files, either straight flat or curved ones, and to a new clamping apparatus for manufacturing said files.

With conventional tools the milling of the teeth of files in heat-treated blanks presents difficulties which are mainly the following ones:

(1) It is necessary to use an individual milling cutter for every size of file having a different curved part;

(2) In the case of a steel which is sensitive to deformation during the milling process, such as certain carbon steels, it happens frequently that a straight file is warped and becomes slightly concave;

(3) The files, clamped one against the other on a magnetic table or on any other support, have the tendency to heat up at their point of contact during the milling process, and accordingly the teeth on the borders of the files become less hard than the other, or even unusable.

The object of this invention is to provide for a new process of manufacture to produce curved files wherein cylindrical grinding wheels are used, even for cutting curved files, thus eliminating the necessity of having curved grinding wheels.

Another object of the present invention is to provide means for utilizing the new process of manufacturing files.

A further object of this invention is to provide for a new process of manufacturing files more precisely and with less rejects.

Yet another object of the present invention is to provide for new means for clamping the steel blanks to be ground.

A further object of this invention is to provide for a new type of flat or curved files, having ground teeth, produced by the new and improved process of manufacture.

Various further objects and more specific purposes, features and advantages will clearly appear from the detailed description given below taken in connection with the accompanying drawings which form part of this specification and illustrate merely by way of example one embodiment of the invention.

The invention consists in the new process of manufacturing and in the novel features, arrangements and combination of parts as will be shown and described in connection with the apparatus herein disclosed by way of example only and as illustrative of a preferred embodiment.

It is known that a blank of a file corresponds to a piece of a hardened steel bar into which the teeth are ground or which still has to be curved.

The process according to the invention comprises clamping of the file blanks so that their ends rest on a wedge of such thickness that the longitudinal deflection of said blank cannot go beyond its elastic limit although it is placed fairly close to a magnetic clamping plate so that the attractive power of the latter forces the body of said blank to cling firmly to the surface thereof while the tip portion of the blank which may comprise approximately ½ to ⅓ of the length of the file, deflects in a curve having a deflection equal to the thickness of the wedge.

It is important that each blank is separated from the adjacent one by a non-magnetic spacer in order to avoid any risk of heating up and in order to distribute the side pressure over the entire length of the blanks. Moreover, if the process involves a curved file having a very pronounced curvature, it is necessary to provide for a correction in order to facilitate the grinding of the teeth, because said teeth are cut into the file at an angle which produces a distorted surface as soon as the blank is detached and leveled.

This problem is solved by this invention by applying a transversal torsion to the blank which adds to its longitudinal deflection caused by the wedge, and which compensates thereby the distortion stemming from the angle of the teeth with respect to the curvature.

Finally, flat files are ground by placing at first under each end of the blank one or more very thin wedges, not thicker than several thousands of an inch. For example, the light longitudinal deflection in a file blank of 12″ length causes a curve having a height equal to said deflection, which corresponds perfectly to the characteristics of a flat file, and the second face of said file will be ground after insertion of wedges having doubled the thickness of the first.

In the following description and in the claims, parts will be identified by specific names for convenience, but such names are intended to be as generic in their application to similar parts as the art will permit. Like reference numbers denote like parts in the several figures of the drawings.

Referring now to the drawings,

FIG. 1 illustrates a file blank in position to be ground on a magnetic table, presented in section, and the cylindrical grinding wheel partly cut away;

FIG. 2 is a plane view of several files placed on top of the magnetic table, partly cut away to show one wedge;

FIG. 3 is a cross section of the table and the files on the lines 3—3 of FIGS. 1 and 2, illustrating a schematically indicated oscillating drive of the table supporting the files;

FIGS. 4, 5, 6 and 7 are views of the curved part of a file during the grinding process and afterwards;

FIG. 8 is a cross section of a magnetic table having a file blank attached to it with longitudinal deflection and transversal torsion applied to said file blank by a plurality of keys;

FIG. 9 is a cross section of a modified form of keys;

FIG. 10 is in its right hand part an end view of the magnetic table, showing therein files in position for being ground, and in its left hand part a cross section on the line 10—10 of FIG. 8 illustrating the file blank embedded in the table.

Referring now more particularly to the drawings, which illustrate one example of carrying out the invention, there is disclosed a magnetic table of known design, having a permanent magnet. It comprises a base 1 having a bracket 2 supporting a lever 3 pivotally mounted on a shaft 4. A slot 5 permits the sliding of a stud 6 fixed to a bar 7. Said bar 7 moves the magnetic bodies 8 pressing same against non-magnetic blocks 9. The last body 8' is drilled and tapped to receive the threaded end 8″ of the bar 7. All magnetic elements 8 and non-magnetic elements 9 are slidably arranged between the bottom of the base 1 and the table 10. The latter is composed of magnetic zones 11 and non-magnetic zones 12, said zones being bonded together by a non-magnetic alloy.

When the lever 3 is moved in the sense of the arrow F, the nut 13 will abut against the protruding boss 14, and the magnetic bodies 8 are placed under the non-magnetic zones 12 of the table 10, while the non-magnetic bodies 8 are placed under the magnetic zones 11 of same table. By this means the attraction of the magnets 8 is annulled, so that file blanks 16, 17, 18, 19 of FIG. 2 may be placed for grinding at a suitable angle, on top of the table 10. Spacers 20, 21, 22, 23 are used to separate the blanks from one another while a movable clamp 24 and screws 24' (FIG. 2 FIG. 3) may press said blanks against a fixed clamp 25 which is bolted to the table 10 by screws 26 and 27. Finally the ends of the blanks rest on an interchangeable wedge 28, fixed to the base 1 by screws 29 and 30. Dotted lines 15' in FIG. 1 illustrate a blank in its initial position. The operator moves the lever 3 back against the table which movement brings the bodies 8 back under the zones 11 and the bodies 9 under the zones 12, thus restoring again the flux of the magnetic circle. The blanks, heavily attracted, are forced to deflect so as to conform to the curve 15a, shown in full lines in FIG. 1. At this moment the operator locks the screws 24' by which operation the file blanks are completely fixed to the table 10. The magnetic table 10 is placed on a movable table 31 which is oscillated by a rod 32 and a crank pin 33 driven by a motor not shown in the drawing.

The file blanks are alternately moved under the rotating cylindrical grinding wheel 34 which goes down on the blanks 16, 17, 18 and 19 (FIG. 2) and cuts the teeth by attacking first the tip portion 66 of each blank which portion extends slightly above the body of the file 15 because of the wedge 28. (The curvature of blank 15 is intentionally exaggerated in the drawing.) Thereafter, the grinding wheel attacks the right hand portion of the file blank as seen in FIG. 1. As soon as the first tooth has been cut the grinding wheel is shifted by one tooth, then a second tooth is cut and after that the grinding wheel is shifted again by one or two teeth in order to compensate for the feed errors caused by the backlash of the machine. The grinding wheel is finally lifted as soon as the intended depth of the teeth is reached. Then the operator puts the lever 3 back according to the arrow F. He unlocks the screws 24'. The files are thus released from the table 10 and straighten themselves, and the teeth which had been ground flat take a curved shape along the portion which had been deflected.

It has to be mentioned that this operation is only possible for files which will remain flat and which will have only a little curvature, because the axis of the cylindrical grinding wheel on parts 15" is inclined with respect to the blank by 15° according to FIG. 6. The cylindrical grinding wheel thus attacks the deflected portion, for example, at point R (FIG. 6), whereupon it passes out at point P after grinding. Since the file will be taken off the table and straightened, the point P will be found displaced vertically at a distance O for a wedge thickness Q (FIGS. 8 and 9) conforming to the curve in FIG. 5 the height of which is equal to Q". This deflection decreases proportionally toward the flat portion of the file; it takes the form of a slightly inclined face which would be objectionable in the tool. This is corrected by a transversal twisting of the file by the following means: The handle portions of the files or blanks are positioned in recesses 36 milled in a rear part 37 of the table 10 having very precise adjustments (FIG. 10) while the tip portions of the blanks are positioned in very precise key slots 38, 39 formed in keys 128 and another slot 40 formed in a modified key 228. The keys are pivotally mounted on semicircular saddles 41, 42, 43, which are supported individually in cut-outs of the same shape, and are equipped with racks 44, 45, 46 in permanent mesh with worms 47, 48, 49 which are cut on a common shaft 50. This shaft is pivotally mounted in bearings 51, 52, 53, 54, forms part of the base 1, and has a square end 55 for a lever 56.

In order to keep the keys 128 and 228 in place against the base 1 when turning the worm shaft, there is a supporting bar 57 attached to the base 1 by screws 58 to 61. Furthermore, studs are supporting rollers 62, 63 and 64 under which cylindrical faces 62', 63' and 64' of keys 128 and 228 concentric to the center lines of the saddles 41, 42, 43, are permitted to roll during the displacement of the key slots 38, 39, 40 caused by the worms 47, 48, 49.

This very simple mechanism is absolutely efficient and works as follows:

The magnetic table is assumed in a neutral position (no attraction). The operator puts the rear ends of the file blanks into the recesses 36 and their opposite ends into the key slots 38, 39, 40 of FIGS. 8, 9 and 10. There they are in the same position as shown for blank 15 in dotted lines 15' in FIG. 1. The operator moves the lever 3 into the position to apply the magnetic flux to the table 10 (clockwise as seen in FIG. 1); the blanks are firmly held in the recesses 36 while being deflected and conforming to the curved form shown in FIG. 8. The operator moves the lever 56 into the position 56'; the key slots 38, 39, 40 incline on their respective shafts under the force of the worms 47, 48, 49, and the file blanks distort under transversal torsion, as shown in positions 17', 18', 19' of FIG. 10. They thus take a slightly distorted shape whereby the points 0, high and low, correspond to the distance O (FIGS. 7 and 8) while they are at the same time under the longitudinal deflection Q. Then the blanks are moved under the cylindrical grinding wheel to grind the teeth, thereafter they are removed to straighten and to take the form of a curved file, as shown in FIG. 5, all teeth of which are in the same plane.

An especially interesting application of the process of the invention comprises the grinding of file blanks partly or totally curved in the final shape, followed by hardening. Thereafter they are placed on the magnetic table, the wedges and key slots of which are set in such manner that the face of the blank is straightened again; thus, the work of the grinding wheel is greatly reduced since the grinding wheel has only to go down to the depth of the teeth instead of grinding the excess of material to be removed in the shaping of the unformed blank.

While the invention has been described and illustrated with respect to a particular preferred example which will give satisfactory results, it will be understood by those skilled in the art, after understanding the principle of the invention, that various other changes and modifications may be made without departing from the spirit and scope of the invention and it is intended, therefore, in the appended claims to cover all such changes and modifications.

What I claim is:

1. Method for manufacturing flat or curved files from hardened blanks which consists in inversely elastically deflecting said blanks and then grinding file teeth therein with a cylindrical grinding wheel.

2. Method for manufacturing curved files which consists in elastically deflecting the file blanks by a combined longitudinal bending and transversal torsion and then cutting teeth therein with a cylindrical grinding wheel.

3. Method for manufacturing curved files which consists in preforming the file blanks into their final curved shape in advance by machining the same, hardening said blanks, then deflecting the preformed blanks by applying a combined bending and transversal torsion force until the curved side of said blanks becomes straight, and then grinding the teeth therein with a cylindrical grinding wheel.

4. Method for manufacturing files according to claim 3 wherein not more than approximately ½ to ⅓ of the length of the file blanks is elastically deflected longitudinally and wherein the tips of said file blanks are by torsion elastically deflected transversally to compensate the distortion stemming from the angle of the teeth with respect to the longitudinal curvature.

5. Method for manufacturing files which consists in elastically deflecting the file blanks by a combined longitudinal bending and transversal torsion and then grinding the teeth in said blanks while in the deflected condition.

6. Method according to claim 5, wherein the blanks are first hardened.

References Cited in the file of this patent

UNITED STATES PATENTS

| | | |
|---|---|---|
| 28,947 | Whipple | June 26, 1860 |
| 430,094 | Spencer | June 10, 1890 |
| 1,125,198 | Spencer | Jan. 19, 1915 |
| 2,183,385 | Wright | Dec. 12, 1939 |
| 2,214,954 | Crater | Sept. 17, 1940 |
| 2,255,269 | Perriue | Sept. 9, 1941 |
| 2,343,271 | Anheuser | Mar. 7, 1944 |
| 2,579,521 | Sorensen | Dec. 25, 1951 |
| 2,709,324 | Hull | May 31, 1955 |
| 2,710,501 | Hull | June 14, 1955 |

FOREIGN PATENTS

| | | |
|---|---|---|
| 53,470 | Switzerland | Aug. 25, 1910 |
| 73,798 | Sweden | Sept. 6, 1929 |
| 504,912 | Germany | Aug. 9, 1930 |
| 1,027,279 | France | Feb. 11, 1930 |